(12) United States Patent
Salier-Hellendag et al.

(10) Patent No.: US 10,204,077 B2
(45) Date of Patent: Feb. 12, 2019

(54) RICH TEXT EDITOR

(71) Applicant: Facebook, Inc., Menlo Park, CA (US)

(72) Inventors: Daniel Isaac Salier-Hellendag, Chicago, IL (US); Joshua Keith Duck, San Carlos, CA (US); Aleksandr Andreyevich Zelenskiy, Burlingame, CA (US)

(73) Assignee: Facebook, Inc., Menlo Park, CA (US)

( * ) Notice: Subject to any disclaimer, the term of this patent is extended or adjusted under 35 U.S.C. 154(b) by 345 days.

(21) Appl. No.: 14/860,492

(22) Filed: Sep. 21, 2015

(65) Prior Publication Data

US 2017/0083480 A1    Mar. 23, 2017

(51) Int. Cl.
| | |
|---|---|
| G06F 17/00 | (2006.01) |
| G06F 17/21 | (2006.01) |
| G06F 17/24 | (2006.01) |
| G06F 17/22 | (2006.01) |
| G06F 17/27 | (2006.01) |
| G06F 17/30 | (2006.01) |

(52) U.S. Cl.
CPC ........ *G06F 17/211* (2013.01); *G06F 17/2247* (2013.01); *G06F 17/24* (2013.01); *G06F 17/27* (2013.01); *G06F 17/212* (2013.01); *G06F 17/241* (2013.01); *G06F 17/248* (2013.01); *G06F 17/30905* (2013.01)

(58) Field of Classification Search
CPC ...... G06F 17/211–17/212; G06F 17/24; G06F 17/241; G06F 17/248; G06F 17/2247; G06F 17/30905; H04L 12/58; H04L 51/1827; H04L 51/18; H04L 67/104
See application file for complete search history.

(56) References Cited

U.S. PATENT DOCUMENTS

| | | | |
|---|---|---|---|
| 2009/0013244 A1* | 1/2009 | Cudich ................ | G06F 17/21 715/234 |
| 2009/0259949 A1* | 10/2009 | Verlaan ............... | G06F 17/2247 715/760 |
| 2011/0252339 A1* | 10/2011 | Lemonik ............ | G06F 17/2288 715/753 |
| 2011/0258538 A1* | 10/2011 | Liu ...................... | G06F 17/2211 715/256 |

* cited by examiner

*Primary Examiner* — Quoc A Tran
(74) *Attorney, Agent, or Firm* — FisherBroyles, LLP

(57) ABSTRACT

The disclosure is directed to a rich text editor ("editor") that facilitates generation and manipulation of rich text content. The editor can be integrated into an application, e.g., a social networking application, to support rich text content creation in the application. The application renders a document containing rich text content using a document object model (DOM). The editor stores a state of the document, e.g., features such as formatting style of content, separate from the DOM, thereby eliminating and/or minimizing any inconsistencies that can be caused due to storing the state with the DOM. The editor stores the content as multiple data blocks and the state as multiple feature data objects. A rendering component of the text editor renders the document by outputting the document into the DOM using the data blocks and the feature data objects. The rendering component includes APIs for rendering the document in various formatting styles.

20 Claims, 8 Drawing Sheets

RICH TEXT EDITOR

BACKGROUND

A rich text editor is a software application for creating and editing rich text content, e.g., text with various formatting styles such as bold, italics, list items, etc. An online rich-text editor is an interface for editing rich text within a web browser or browser like apps on a client computer ("client") which present the user with a "what-you-see-is-what-you-get" (WYSIWYG) editing area. Typically, the goal of such editors is to reduce the effort for users trying to express their formatting directly as valid hyper-text markup language (HTML) markup.

The formatting capabilities of current rich text editors are naïve, and their formatting behavior is, sometimes, erratic. For example, the highlighting of text is based on a measurement of the text portion in the graphical user interface (GUI). The editors measure the particular portion of the text to be highlighted, then generate a highlighted portion of the particular measure and then assume the text overlaps with the highlighted portion of the GUI. This method can be inaccurate, e.g., when the GUI is zoomed, the highlighted text splits into multiple lines, as the highlighted portion then does not match with the portion of the text to be highlighted.

The technical capabilities of such editors are limited. Many rich text editors, e.g., "contentEditable," store a state of the document, e.g., formatting features, with a document object model (DOM) that is used to represent the document. The state of the document cannot be separated from the DOM. The drawback of that is the text editor is dependent on the nature of the browser, and different browsers store the DOM differently. Different browsers can use different HTML tags for different styles. So when the document is saved, the way the document is saved is dependent on the browser. When the document is viewed on different browsers it can be rendered differently and can therefore, be inconsistent across browsers. For example, Google Chrome™ browser from Google of Mountain View, Calif., can represent a paragraph in a different way from Safari® web browser from Apple® of Cupertino, Calif., and in a different way from Firefox® web browser from Mozilla® of Mountain View, Calif.

DETAILED DESCRIPTION

Figure 1:
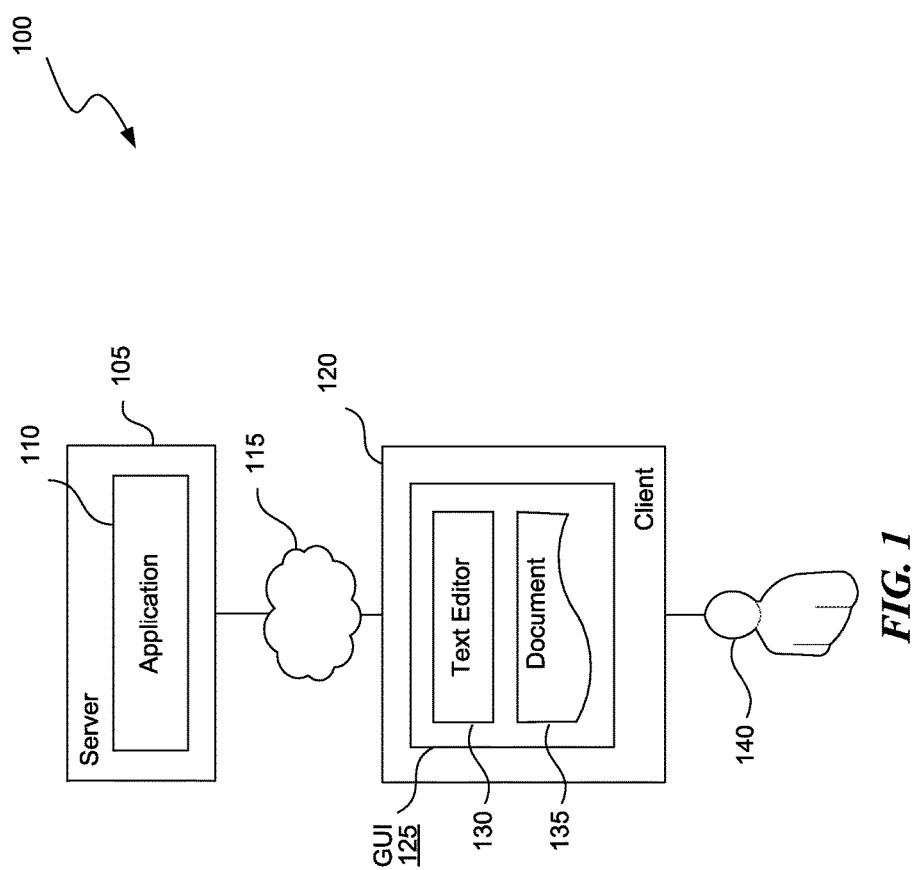
FIG. 1 is a block diagram of an environment in which the disclosed embodiments can be implemented.

Embodiments are disclosed for a rich text editor ("editor") that facilitates generation and manipulation of rich text content, e.g., in online applications. The editor can be integrated into an application, e.g., a social networking application, to support rich text content creation in a graphical user interface (GUI) of the application. The editor can also be used for developing an independent stand-alone application for creating rich text content. The editor supports creating rich text content in applications that represent a document using a document object model (DOM). The document represented using DOM can be viewed and/or edited using a web browser application or browser-like or browser-based applications. When a browser stores a document, the browser typically stores the state of the document, e.g., features of the document such as formatting style of content, with the DOM. One of the disadvantages with this class of document storage is that different browsers can generate the DOM for the document differently, and therefore, the document may appear differently when viewed using different browsers. However, the disclosed editor can eliminate and/or minimize these inconsistencies by storing a state of the content separately from the DOM.

The text editor includes a data representation component that stores a content of the document, e.g., as a number of data blocks, and the state of the content, which includes the features of the content, e.g., formatting style of the content, as a set of feature data objects. A rendering component of the text editor can then render the document by outputting the document into the DOM using the data blocks and the set of feature data objects. The rendering component can include various application programming interfaces (APIs) for rendering different features of the document. For example, the rendering component can have a first API for rendering text in a "bold" format style, a second API for rendering the text in a specific "block quote" style, and a third API for rendering the text as a list item. In some embodiments, the application can display a specified type of text in a specified format. For example, the social networking application can display a username of a user of the application, e.g., also referred to as a "mention" with a specified background color, font, size, an image associated with user, etc. The rendering component can have a rendering API that is configured to render the mentions in the specified format.

One of the advantages of the disclosed embodiments is that if a format in which a specified feature being rendered is to be changed, a user, e.g., a software developer, can change the format by making the changes in the rendering API corresponding to the specified feature and the new format would be effective when the content is reloaded. The software developer may not have to make any changes to the DOM of the document.

In some embodiments, the document associated with the application can be rendered in a GUI of the application, e.g., a web page containing the document, which can be viewed using a web browser, e.g., on a client computer ("client"). The text editor can be implemented using a programming language, e.g., JavaScript, and can be integrated into the application as one or more JavaScript objects. The text editor includes various APIs, e.g., a first set of APIs for creating (a) the data blocks that represent the content of document and (b) a set of data objects that represent the features of the content; and a second set of APIs for rendering the document, e.g., by outputting the content and the state of the content into the DOM.

When the web page is loaded, the document is rendered and displayed in a browser or other application executing on the client. A user associated with the client can edit the content. For example, the user can add some text and format the text in a specified formatting style. The text editor reads the content of the document and generates data blocks to store the content and feature data objects to store a state of the content, e.g., features of the content. The text editor then renders the document by outputting the content and the state of the content into the DOM using the rendering API. Further, in some embodiments, when the user makes a change to a portion of the document, the text editor identifies that portion and re-renders only the changed portion instead of rendering the whole document, thereby saving computing resources, and enhancing user experience in viewing the document.

In some embodiments, the text editor can be rendered into any environment, DOM or otherwise, which is capable of serving the purpose of displaying the text editor and receiving input, for instance, non-browser based applications such as native mobile applications.

Turning now to the figures, FIG. 1 is a block diagram of an environment 100 in which the disclosed embodiments can be implemented. The environment 100 includes a server computer ("server") 105 on which an application 110, e.g., a social networking application, is implemented. The application 110 can be accessed by a user, e.g., user 140, using a client 120. The client 120 can access the server 105 via a communication network 115, e.g., Internet. The client 120 can be any of various types of computing devices, e.g., a desktop PC, a laptop, a smartphone, a tablet PC, or a wearable device. The client 120 can host one or more operating systems, e.g., Microsoft Windows, Mac OS, iOS, or Android. The user 140 can access the application 110 using a web browser on the client 120 or an app, which is associated with the application 110, that is installed at the client 120.

The application 110 can display rich text content, e.g., contained in a document 135, to the user 140 via a GUI 125, e.g., a web page, that is rendered at the client 120. The document 135 can be any type of content. For example, the document 135 can be comments or notes in a social networking application. In another example, the document 135 can include an image and/or a video. In some embodiments, the application 110 embeds a text editor 130 into the GUI 125 that can be used to generate and/or edit rich text in the document 135. In some embodiments, the text editor 130 is implemented using JavaScript, and is embedded into the GUI 125 as one or more JavaScript objects.

In some embodiments, the text editor 130 may not be visible in the GUI 125 and, in some embodiments, at least portions of the text editor 130 may be visible. For example, in some modules of the application 110, such as creation of notes in a social networking application, the text editor 130 provides tools, e.g., user interface (UI) elements for formatting the content, and therefore, the tools of the text editor 130 may be visible to the user 140 in the GUI 125. In some modules, such as posting comments in the social networking application, the text editor 130 may not provide any UI elements to format the content, and therefore, may not be visible to the user 140; however, the user 140 can use other means, e.g., keyboard shortcuts, to trigger the text editor 130 to format the content displayed in the GUI 125. Regardless of whether the text editor 130 is visible to the user 140 or not, the text editor 130 can facilitate the user 140 in creating and/or editing rich text content in the document 135.

Figure 2:
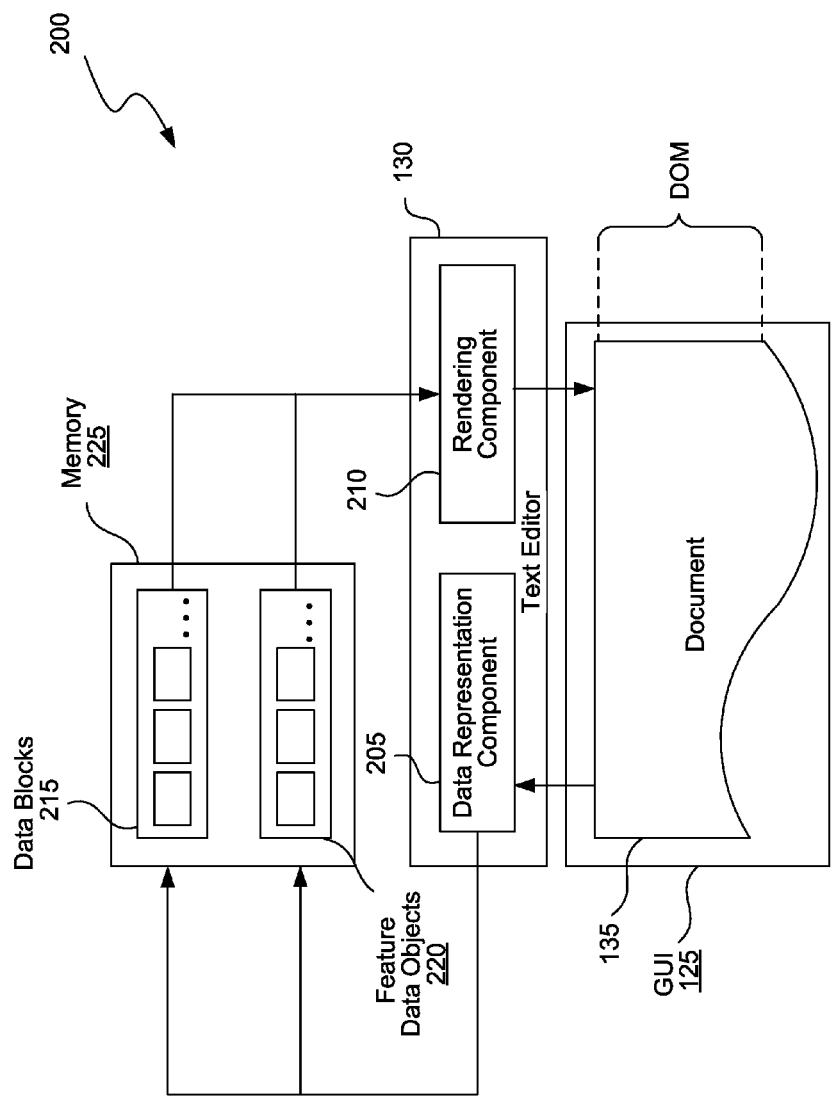
FIG. 2 is a block diagram of an example of generating a rich text document using the text editor of FIG. 1, consistent with various embodiments.

FIG. 2 is a block diagram of an example 200 of generating a rich text document using the text editor of FIG. 1, consistent with various embodiments. The user 140 can input content of the document 135, e.g., rich text content, into the GUI 125, e.g., using an input device (not illustrated) associated with the client 120. It should be noted that while the content is referred to as rich text content, the content can also include other types of data, e.g., image, videos, etc. The user 140 can format the content into various formatting styles, e.g., bold, underline, italics, a paragraph, a block quote, a list item, etc., or other custom formatting styles, e.g., mention. For example, when the user 140 mentions a user of the social networking application in the content, e.g., a comment, the text editor 130 can render a username, which is identification information of a user of the social networking application, with a specified background color, font, size of the font, image associated with user, etc. in the GUI 125.

Figure 3:
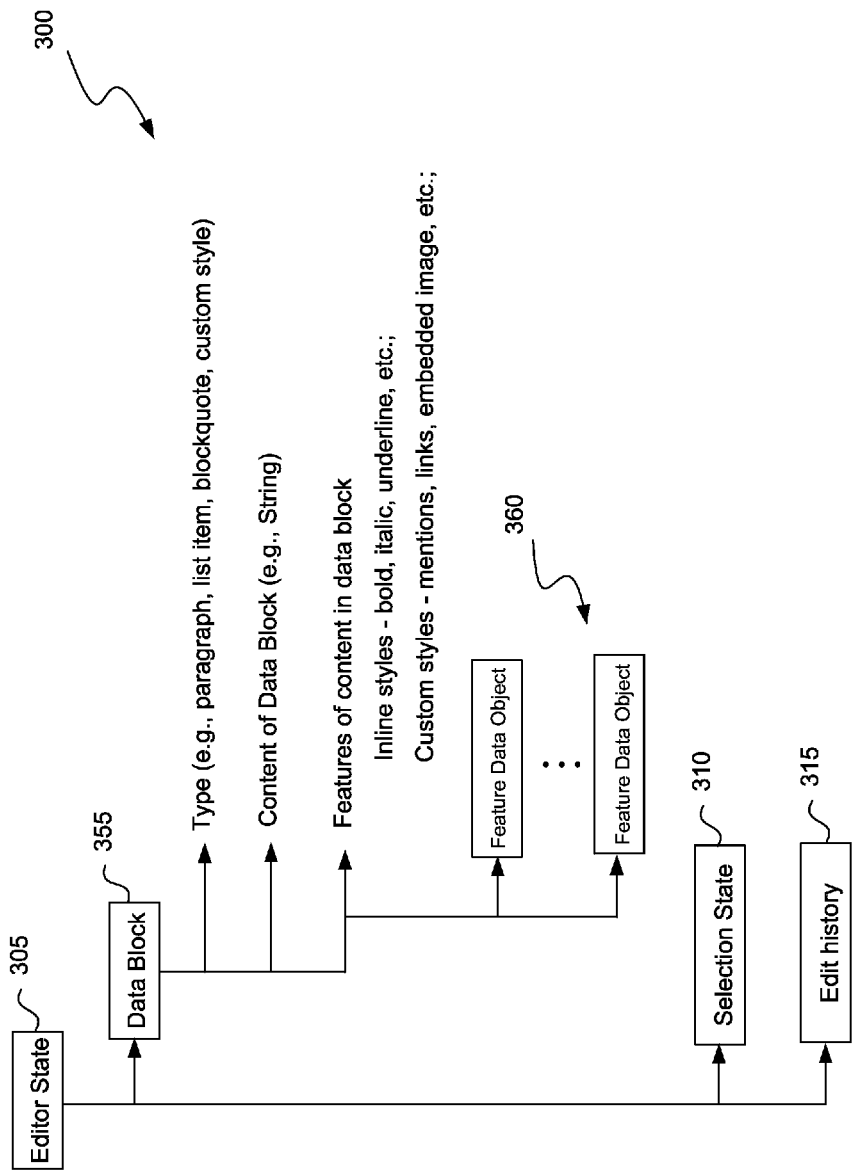
FIG. 3 is a block diagram of an example representation of a state of a text editor of FIG. 1, consistent with various embodiments.
Figure 4:
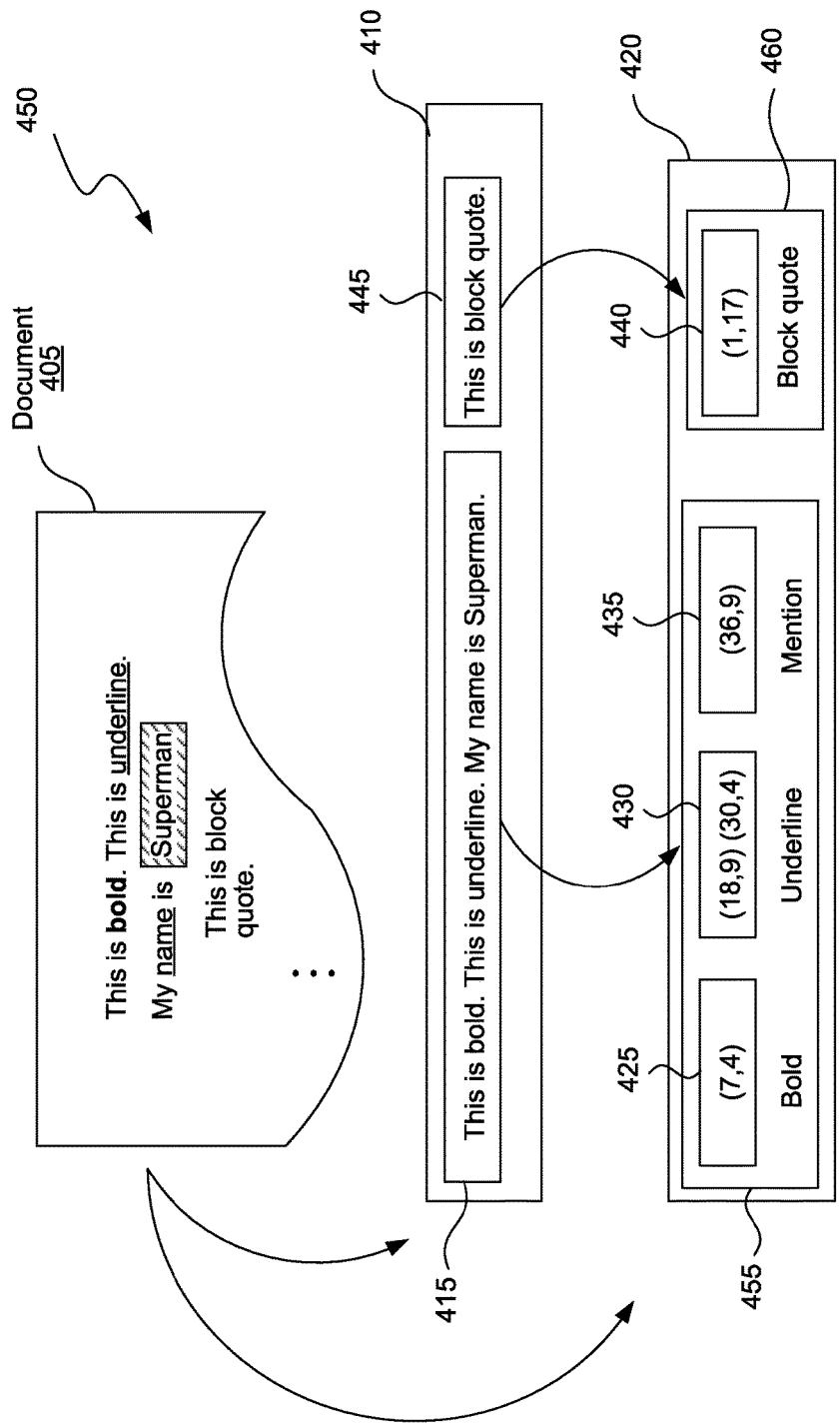
FIG. 4 is a block diagram of another example representation of a document by a text editor of FIG. 1, consistent with various embodiments.

The rich text content input by the user 140 is stored by the text editor 130. The text editor 130 includes a data representation component 205 that stores the content of the document 135 and a state of the content as separate data objects. For example, the data representation component 205 stores the content of the document 135 as one or more data blocks, e.g., data blocks 215. A data block can be of a specific size, and contains at least a portion of the content of the document 135. The data blocks 215 contain only the content of the document 135 but not the state of the content, e.g., the features such as formatting style of the content. An example of the data blocks 215 is illustrated in FIGS. 3A and 3B. The data representation component 205 stores the state of the content as one or more feature data objects 220. An example of the feature data objects 220 is illustrated in FIGS. 3 and 4.

FIG. 3 is a block diagram of an example representation 300 of a state of a text editor of FIG. 1, consistent with various embodiments. The data representation component 205 can represent a document, e.g., the document 135, as a number of data blocks, e.g., data block 355, in which each data block can store a portion of the content of the document. In some embodiments, the data block 355 is similar to the data blocks 215 of FIG. 2. The data block 355 can have a number of attributes, e.g., a type of content represented by the data block, content of the data block, and features of the content. The type attribute indicates a type of the content stored in the data block 355. For example, the type can be a paragraph, a list item, a blockquote, etc., or a custom type, which can be user-defined. In some embodiments, the data block contains content of a single type. For example, if the document has a paragraph type content and a blockquote type content, the text editor 130 can represent the document using two separate data blocks, one for each type. Further, content of a single type can also be stored as multiple data blocks. For example, if the document has multiple paragraphs, the paragraphs can be represented using one or more data blocks, e.g., depending a size of the data block. The size of the data block determines the amount of content a data block can store. The size of the data block can be configurable. In some embodiments, the size of at least two data blocks of the document can be different. The content attribute of the data block 355 stores the actual content of the document, e.g., as a string.

The features attribute of the data block 355 indicates the features, e.g., formatting style, associated with the content stored in the data block 355. The data representation component 205 represents the state or features of the content that is stored in the data block 355 using a feature data object, e.g., feature data objects 360. In some embodiments, the feature data objects in 360 can be similar to the feature data objects 220 of FIG. 2. In some embodiments, each of the features is represented using a feature data object. A feature data object corresponds to a specified feature and includes information regarding the portion of the content that is to be rendered with the specified feature. If the content has "n" number of features, then, in some embodiments, the data representation component 205 creates "n" number of feature data objects 360.

For example, a feature data object includes information regarding the portion of the content in the data block 355 that is formatted in bold. The feature data object can also include a range of the text that is to be formatted in bold. In some embodiments, the range is specified as a range tuple, e.g., an offset and a length, in which the offset identifies a position of a character in the document 135 starting from which the text is to be formatted in bold, and the length identifies the number of characters from the offset that is to be formatted in bold. In some embodiments, the ranges of the text can be expressed in ways other than the range tuple. For example, the range can be expressed using bitmasks. The bitmasks can indicate which of the characters in the content is to be rendered with the specified feature. Similarly, other feature data objects can be used to represent other features of the content stored in the data block 355.

Referring back to FIG. 2, the data representation component 205, accordingly stores the document 135 as data blocks 215 and feature data objects 220. After the data blocks 215 and the feature data objects 220 are created, the data representation component 205 may store them in a storage device, e.g., a memory 225, of the client 120. The text editor 130 may further transmit the document 135 to the server 105 for storage at a persistent storage medium associated with the server 105. The text editor 130 may transmit the document 135 to the server 105 either as data blocks 215 and the feature data objects 220 or convert them to another suitable format for transmission to the server 105. In some embodiments, the text editor 130 may transmit the document 135 to the server 105 as data blocks 215 and feature data objects 220 but the server 105 may convert them to another suitable format. Further, the text editor 130 may send the document 135 to the server 105 based on a trigger condition, e.g., a specified interval, instruction to save the document 135 from the user 140, closing the GUI 125.

By storing the document 135 as a set of data blocks 215 and feature data objects 220, the state of the content is stored separate from the DOM of the document 135, and thus any inconsistencies that can arise if the state of the content was stored with the DOM is eliminated.

The text editor 130 includes a rendering component 210 that can render the document 135 in the GUI 125. The rendering component 210 renders the document 135 by generating a DOM of the document 135 from the data blocks 215 and the feature data objects 220. As described earlier, a feature data object corresponds to a specified feature, e.g., formatting style, and includes information regarding the portion of content to which the specified feature is to be applied. The rendering component 210 outputs the portion of the content by applying the specified feature into the DOM. The rendering component 210 has a number of rendering APIs for rendering the content in various formatting styles. In some embodiments, each feature of the content has an associated rendering API in the rendering component 210. Each rendering API has the necessary instructions to output the content with the corresponding feature, e.g., specified format. Examples of the rendering APIs are illustrated in FIG. 4.

In some embodiments, the data representation component 205 also stores other states, e.g., a selection state 310 of the text editor 130 and an edit history 315 of the content. The selection state 310 of the text editor 130 can include information regarding a portion of the content that is selected by the user. The selection state 310 can be used by the rendering component 210 to render a portion of the content that is selected in a specified format. The selection state 310 information can include a range of the text that is selected by the user, e.g., a "from offset" value, which indicates an offset of the character in the data block from which the selection starts, and a "to offset" value, which indicates an offset of the character in the data block where the selection ends. If the selection of the text spans over a number of data blocks, the selection state information can include a first key associated with the data block from which the selection starts and a second key associated with the data block at which the selection ends. In some embodiments, each of the data blocks are associated with a unique key, e.g., that is generated by the text editor 130.

The edit history 315 can include information regarding various actions performed on the document 135, which can be used to facilitate an undo and/or a redo operation on the document 135. In some embodiments, the edit history 315 is maintained using a stack data structure. In some embodiments, the content, the state of the content (e.g., represented using data block 355 and feature data objects 360), the selection state 310, and the edit history 315 together form a state of the text editor 130, e.g., editor state 305.

FIG. 4 is a block diagram of an example representation 450 of a document 405 by a text editor of FIG. 1, consistent with various embodiments. In some embodiments, the document 405 is similar to the document 135 of FIG. 1. The data representation component 205 represents the content of the document 405 as data blocks 310. In some embodiments, the data blocks 410 are similar to the data blocks 215 of FIG. 2. The data blocks 410 can be an ordered list of the data blocks, that is, the data blocks 415 and 445 can appear in the order their corresponding content appears in the document 405. In the example 450, each of the data blocks 410 contains a portion, e.g., content of a particular type, from the document 405. For example, a first data block 415 contains the "paragraph" type content—"This is bold. This is underline. My name is Superman.", and the second data block 445 contains "blockquote" type content—"This is block quote". Note that while the data blocks 410 store the content of the document 405, they do not store the features associated with the content, e.g., formatting styles such as bold, underline.

The data representation component 205 stores the state of the content as one or more feature data objects 420. In some embodiments, the state of the content includes features of the content, e.g., formatting style of the content. In some embodiments, the feature data objects 420 can be similar to the feature data objects 220 of FIG. 2. The feature data objects 420 include information regarding the features of the content stored in the data blocks 410. For example, a first set of feature data objects 455 contains feature data objects that include information regarding the features of the content of the first data block 415, and a second set of feature data objects 460 contains a feature data object that includes information regarding the content stored in the second data block 445.

A first feature data object 425 includes information regarding the portion of the content in the first data block 415 that is formatted in bold. The first feature data object 425 includes a range of the text that is to be formatted in bold. The range can be specified as a range tuple or a bitmask or in other convenient ways. For example, the word "bold" in the document 405, which is to be rendered with bold formatting, is represented in the first feature data object 425 as (7,4), where "7" is the offset of character "b" in the first data block 415 and "4" is the number of characters from "b" (including "b") that is to be formatted in bold.

Similarly, the data representation component 205 generates the second feature data object 430 for representing the underline formatting feature of the text "underline" and "name." Note that the second feature data object 430 includes two range values "(18, 9)" and "(30, 4)" identifying two different portions of the content that is to be rendered with the underline feature. While the example representation 450 illustrates one feature data object being generated for representing a specified feature regardless of the number of portions of the content that has the specified feature, it is also possible to generate a feature data object for each portion of the text that has the specified feature.

The third feature data object 435 represents the mention feature of the text. For example, the text "Superman," which is a username of user in the social networking application, is rendered with a specified background color as illustrated in document 405. In some embodiments, the mention can be triggered by a specified input in the editor. For example, the user can prefix a user name with a symbol "@" to indicate to the text editor 130 that the text following the symbol is a username, which the text editor 130 can then render as a mention. The fourth feature data object 440 represents the block quote formatting style feature of the text "This is block quote," which can be rendered with a specified indent and line spacing. The above features are just example features of the text. The content of the document 405 can be associated with various other features.

Figure 5:
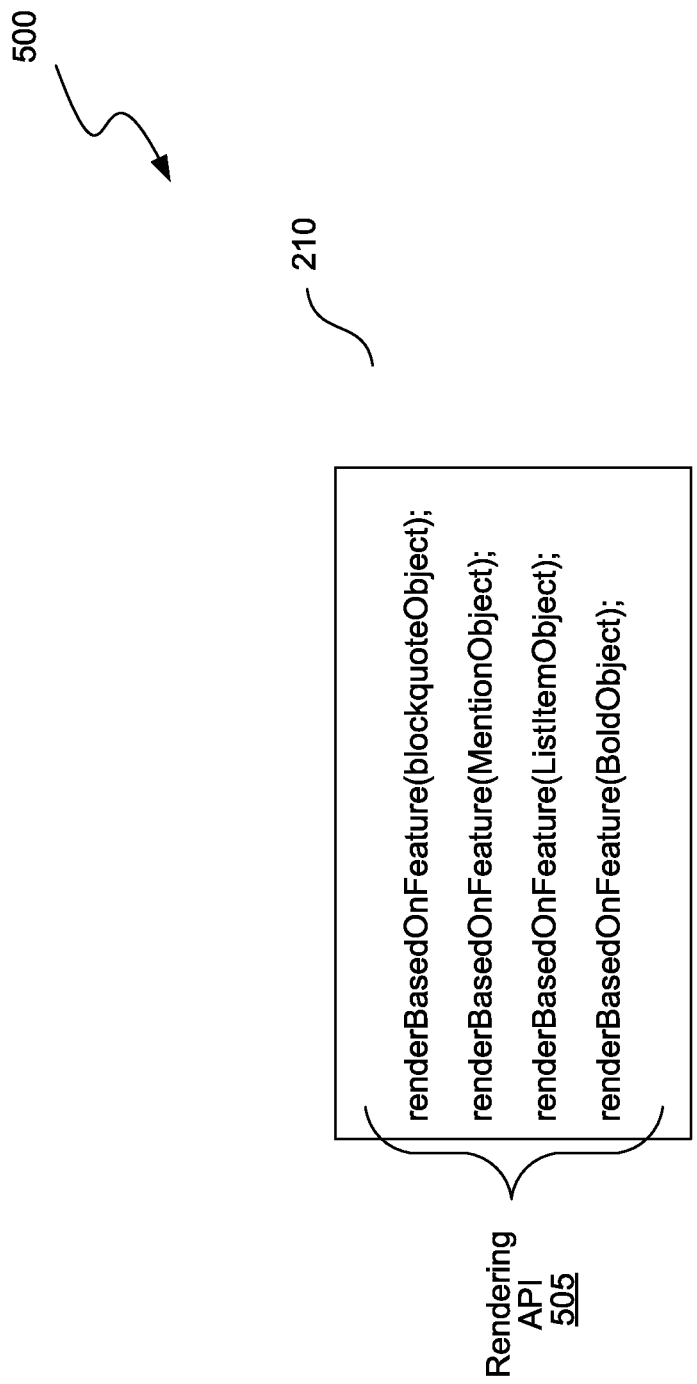
FIG. 5 is a block diagram illustrating a pseudocode of example rendering APIs of a rendering component of FIG. 2, consistent with various embodiments.

FIG. 5 is a block diagram illustrating a pseudocode of example rendering APIs of a rendering component of FIG. 2, consistent with various embodiments. The rendering component 210 includes rendering APIs 505 for rendering the content in various formatting styles. For example, the "renderBasedOnFeature(BlockquoteObject)" is an API for rendering content as a block quote. The "renderBasedOnFeature(BlockquoteObject)" API can take a feature data object, e.g., fourth feature data object 440, as an input, obtain the content from the data blocks, e.g., data blocks 410, based on the range specified in the feature data object and then render the content as block quote, e.g., by outputting the portion of the content as block quote into the DOM of the document 135.

Similarly, the "renderBasedOnFeature(MentionObject)" API of the rendering component 210 is used to render mentions in the document 135. As described above, certain types of text in the content, e.g., a username of a user of the social networking application, is rendered with a specified background color, font, size of the font, image associated with user, etc. in the GUI 125. For example, the username in a comment posted in a social networking application is rendered as a mention. The "renderBasedOnFeature(MentionObject)" API has the necessary instructions to render the identified text with the specified background color, font, size of the font, image associated with user, etc.

Accordingly, the rendering component 210 renders the content of the document 135 using the data blocks 215 and the feature data objects 220. One of the advantages of storing the state of the content separate from the DOM of the document is that if a particular feature is to be modified, e.g., a formatting style of the feature is to be changed, just the corresponding rendering API in the rendering component 210 may have to be modified to render as per the new formatting style; the DOM of the document may not have to be altered. The DOM is automatically updated when the GUI 125 is refreshed and/or reloaded, e.g., as the rendering API in the rendering component 210 re-renders the content using the modified rendering API. For example, if a background color of the mention has to be changed from blue to green, the "renderBasedOnFeature(MentionObject)" API has to be modified to render the mentions with the green background color. The DOM of the document 135 may not have to be changed. Similarly, a feature can be disabled by making changes to the corresponding rendering API. For example, if the mention feature is to be disabled, the "renderBasedOnFeature(MentionObject)" API can be changed to disable rendering the text with any specific formatting.

When the user 140 changes the document 135, e.g., adds content, the text editor 130 identifies the changed portion, and renders only the changed portion of the document 135. The text editor 130 may not have to render the whole document 135 upon the change, thereby saving computing resources and enhancing user experience.

Note that the above rendering APIs are just examples for illustrating that various rendering APIs for rendering in various formatting styles can be used. The syntax, the input and output parameters of the APIs can be different from what is illustrated above.

Figure 6:
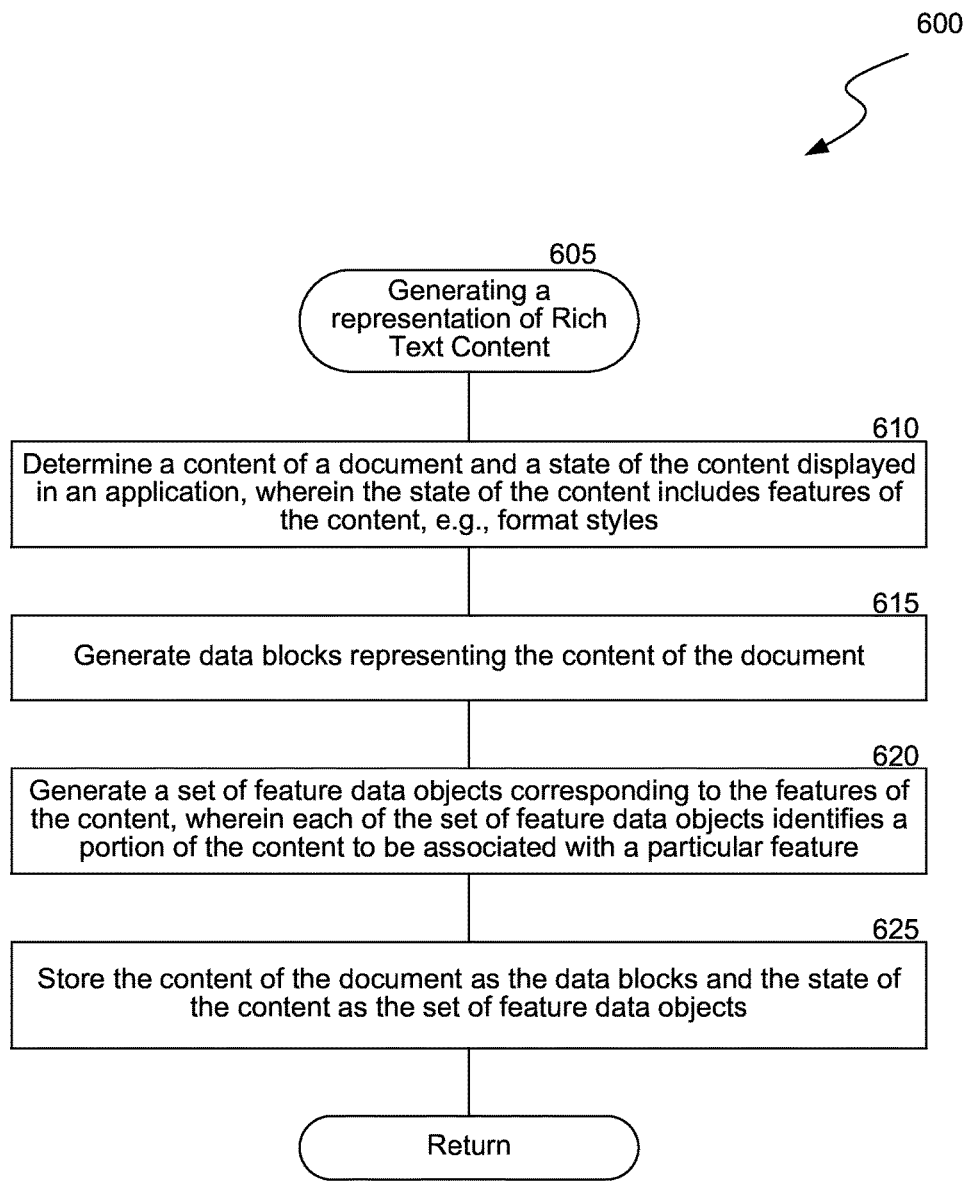
FIG. 6 is a flow diagram of a process of generating a representation of rich text content using a text editor of FIG. 1, consistent with various embodiments.

FIG. 6 is a flow diagram of a process 600 of generating a representation of rich text content, consistent with various embodiments. In some embodiments, the process 600 may be implemented in the environment 100 of FIG. 1. The process 600 begins at block 605, and at block 610, a data representation component 205 of the text editor 130 determines a content of a document, e.g., document 135, displayed by an application, e.g., application 110, in a GUI of the application. The data representation component 205 also determines a state of the content, e.g., features such as formatting style of the content.

At block 615, the data representation component 205 stores the content of the document in one or more data blocks, e.g., data blocks 215 of FIG. 2.

At block 620, the data representation component 205 generates a set of feature data objects, e.g., feature data objects 220, corresponding to the features of the content. In some embodiments, each feature type of the content can have a corresponding feature data object. For example, a bold formatting style can have one feature data object, a list item formatting style can have a feature data object. In some embodiments, each of the set of feature data objects includes identification information of a portion of the content that is to be associated with a corresponding feature.

At block 625, the data representation component 205 stores the content of the document as the data blocks and the state of the content as the set of feature data objects, and the process 600 returns.

Figure 7:
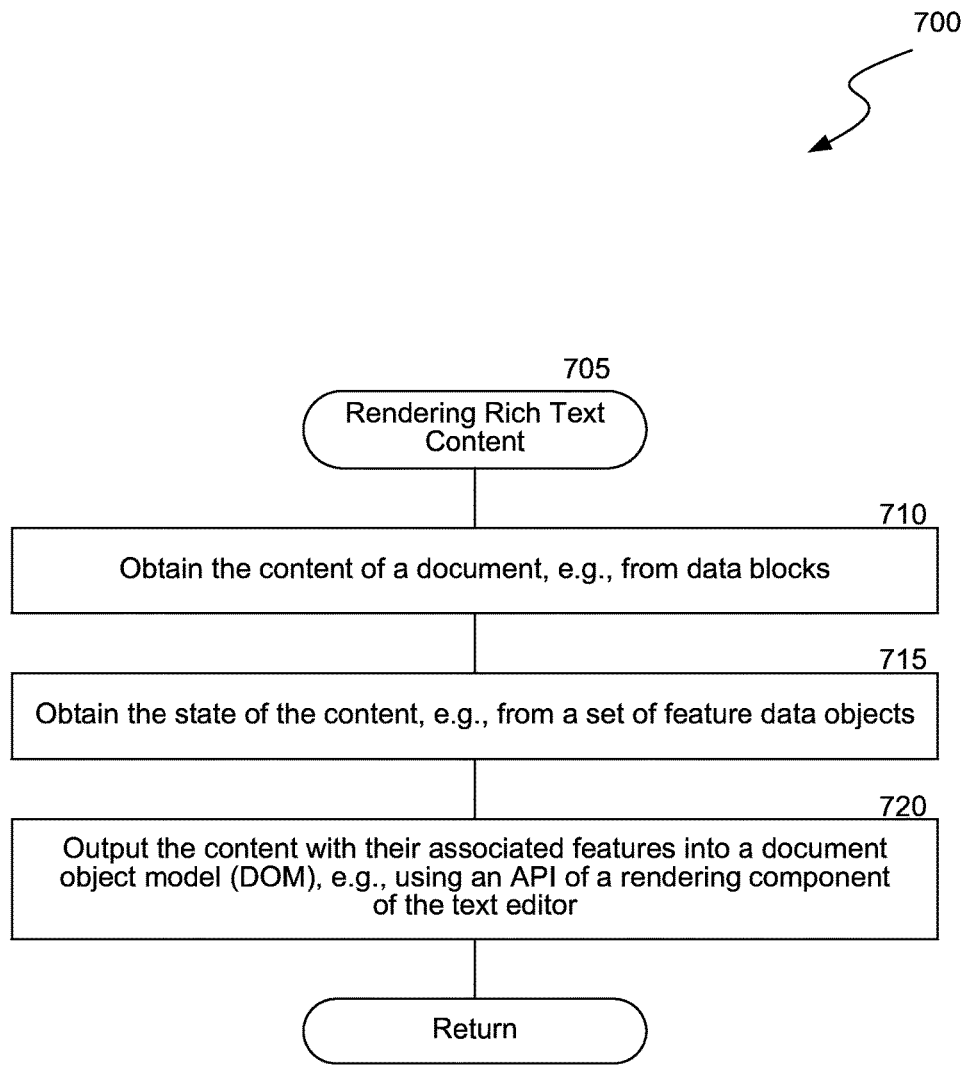
FIG. 7 is a flow diagram of a process of rendering a document having rich text content using a text editor of FIG. 1, consistent with various embodiments.

FIG. 7 is a flow diagram of a process 700 of rendering a document having rich text content, consistent with various embodiments. In some embodiments, the process 700 may be implemented in the environment 100 of FIG. 1. In some embodiments, the process 700 renders the document using a representation of document generated by the process 600 of FIG. 6. The process 700 begins at block 705, and at block 710, a rendering component 210 of the text editor 130 obtains the content of the document 135 from the data blocks, e.g., data blocks 215.

At block 715, the rendering component 210 obtains the state of the content from the feature data objects, e.g., feature data objects 220.

At block 720, the rendering component 210 renders the document 135 by outputting the content with their associated features into the DOM. For example, the rendering component 210 renders the content with their associated features using rendering APIs, e.g., rendering APIs 505. In some embodiments, the rendering component 210 includes a rendering API for each of the features of the content.

Figure 8:
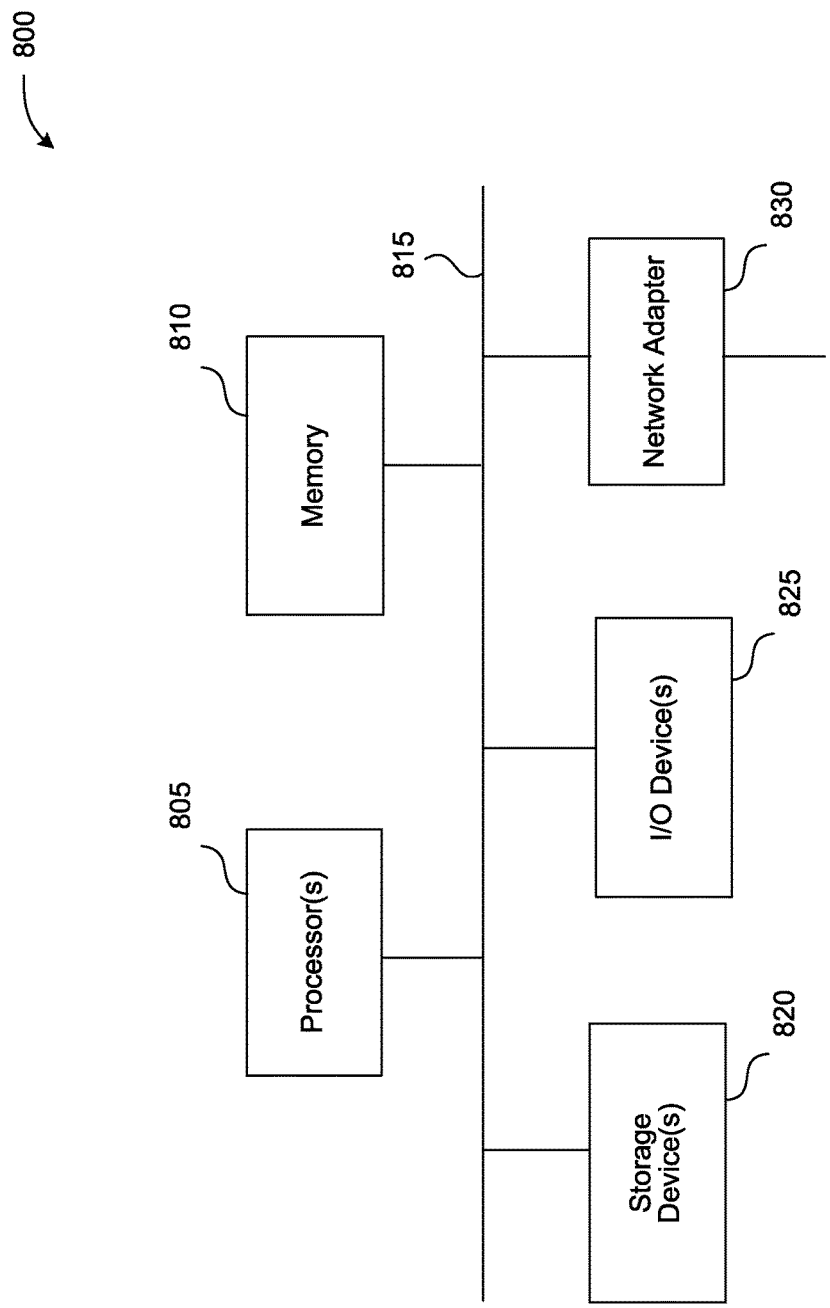
FIG. 8 is a block diagram of a processing system that can implement operations of the present invention.

FIG. 8 is a block diagram of a computer system as may be used to implement features of the disclosed embodiments. The computing system 800 may be used to implement any of the entities, components or services depicted in the examples of the foregoing figures (and any other components and/or modules described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   determining, by a text editor associated with an application, a content of a document and a state of the content, wherein the state of the content includes multiple features of the content, wherein a first feature of the features specifies a format associated with a first portion of the content;
   generating, by the text editor and from the document, multiple data blocks representing the content of the document, wherein a first data block of the data blocks includes at least a portion of the content, wherein the generating includes storing the content as the data blocks in a storage device;

generating, by the text editor and from the document, a set of feature data objects representing the state of the content, wherein a first feature data object of the set of feature data objects corresponds to the first feature and identifies the first portion of the content to be associated with the first feature, wherein the generating includes storing the state of the content as the set of feature data objects in the storage device and the set of feature data objects is separate from the data blocks;

storing, by the text editor, the state of the content independent of a document object model (DOM) that is used to represent the document;

providing the content and the state of the content into the DOM using a rendering application programming interface (API) for rendering the document; and rendering the document using the content and the state of the content.

2. The method of claim 1, wherein the text editor includes an application programming interface (API) for creating the data blocks and the set of feature data objects, the API being of a first programming language.

3. The method of claim 2, wherein storing the state of the content includes storing the data blocks and the set of feature data objects in the first programming language.

4. The method of claim 1, wherein generating the set of feature data objects includes generating, in the first feature data object, a range of the content associated with the first feature.

5. The method of claim 4, wherein generating the range of the content includes:
generating an offset of the content from which the content is to be rendered in the first feature, and
generating a length of the content from the offset for which the content is to be rendered in the first feature.

6. The method of claim 1, wherein rendering the document further comprises:
rendering, by a rendering component of the text editor, the document using the content and the state of the content.

7. The method of claim 6, wherein providing the content and the state of the content further comprises providing the content and the state of the content to the rendering component of the text editor, and
rendering the document further comprises outputting, by the rendering component, the content with their associated features into the DOM, the content obtained from the data blocks and the associated features obtained from the set of feature data objects.

8. The method of claim 6, wherein rendering the document includes:
determining, by the rendering component, multiple portions of the content associated with the first feature, and
outputting the portions of the content in the first feature into the DOM via a first API of the rendering component that is configured to render content in a specified format according to the first feature.

9. The method of claim 8, wherein determining the multiple portions of the content associated with the first feature includes analyzing the first feature data object to identify multiple ranges of the content that is to be rendered in the specified format.

10. The method of claim 8, wherein determining the portions of the content associated with the first feature includes determining the portions of the content having a mention, the mention being identification of a user of the application.

11. The method of claim 10, wherein outputting the portions of the content in the first feature using the first API includes outputting the portions of the content having the mention using a mention rendering API of the rendering component, the mention rendering API rendering the mention in the specified format.

12. A non-transitory computer-readable storage medium storing computer-readable instructions, comprising:
instructions for determining, by a text editor associated with an application, a content of a document and a state of the content, wherein the state of the content includes multiple features of the content, wherein a first feature of the features specifies a format associated with a first portion of the content;
instructions for generating, by the text editor and from the document, multiple data blocks representing the content of the document, wherein a first data block of the data block includes at least a portion of the content, wherein the generating includes storing the content as the data blocks in a storage device;
instructions for generating, by the text editor and from the document, a set of feature data objects representing the state of the content, wherein a first feature data object of the set of feature data objects corresponds to the first feature and identifies the first portion of the content to be associated with the first feature, wherein the generating includes storing the state of the content as the set of feature data objects in the storage device and the set of feature data objects is separate from the data blocks;
instructions for storing, by the text editor, the state of the content independent of a document object model (DOM) that is used to represent the document;
instructions for providing the content and the state of the content into the DOM using a rendering application programming interface (API) for rendering the document; and
rendering the document using the content and the state of the content.

13. The non-transitory computer-readable storage medium of claim 12, wherein the instructions for generating the set of feature data objects include:
instructions for generating, in the first feature data object, a range of the content associated with the first feature.

14. The non-transitory computer-readable storage medium of claim 13, wherein the instructions for generating the range of the content include:
instructions for generating an offset of the content from which the content is to be rendered in the first feature, and
instructions for generating a length of the content from the offset for which the content is to be rendered in the first feature.

15. The non-transitory computer-readable storage medium of claim 13, wherein the instruction for rendering the document further comprises:
instructions for rendering, by a rendering component of the text editor, the document using the content and the state of the content.

16. The non-transitory computer-readable storage medium of claim 15, wherein the instructions for providing the content and the state of the content further comprises
instructions for providing the content and the state of the content to the rendering component of the text editor, and instructions for rendering the document further comprises instructions for outputting, by the rendering component, the content with their associated features into the DOM, the content obtained from the data blocks and the associated features obtained from the set of feature data objects.

17. The non-transitory computer-readable storage medium of claim 16, wherein the instructions for rendering the document include:
   instructions for determining, by the rendering component, multiple portions of the content associated with the first feature, and
   instructions for outputting the portions of the content in the first feature into the DOM via a first API of the rendering component that is configured to render content in a specified format per the first feature.

18. The non-transitory computer-readable storage medium of claim 16, wherein the instructions for determining the multiple portions of the content associated with the first feature include:
   instructions for analyzing the first feature data object to identify multiple ranges of the content that is to be rendered in the specified format.

19. A system, comprising:
   a processor;
   a first module of a text editor associated with an application configured to:
   determine a content of a document and a state of the content, wherein the state of the content includes formatting style associated with the content;
   generate multiple data blocks representing the content and a set of feature data objects representing the formatting of the content, wherein a first feature data object of the set of feature data objects corresponds to a first formatting style and identifies the first portion of the content to be associated with the first formatting style and the set of feature data objects is separate from the data blocks; and
   store the state of the content independent of a document object model (DOM) that is used to represent the document, the first module configured to store by:
      storing the content of the document as the data blocks and the state of the content as the set of feature data objects in a storage device; and
   a second module of the text editor configured to output the content with the formatting styles into the DOM using a rendering application programming interface (API), the content obtained from the data blocks and the formatting style obtained from the set of feature data objects.

20. The system of claim 19, wherein the second module is configured to output the content with the formatting styles into the DOM by:
   determining multiple portions of the content associated with the first formatting style, and
   outputting the portions of the content in the first formatting style into the DOM via the rendering API of the second module that is configured to render content in the first formatting style.

* * * * *